United States Patent
Hay et al.

(10) Patent No.: US 9,353,301 B2
(45) Date of Patent: May 31, 2016

(54) COMPOSITION FOR DUST CONTROL

(71) Applicant: Ecolab USA Inc., Naperville, IL (US)

(72) Inventors: Daniel N. T. Hay, Naperville, IL (US);
Peter A. Dimas, Wheaton, IL (US)

(73) Assignee: Ecolab USA Inc., Naperville, IL (US)

( * ) Notice: Subject to any disclaimer, the term of this patent is extended or adjusted under 35 U.S.C. 154(b) by 19 days.

(21) Appl. No.: 14/089,176

(22) Filed: Nov. 25, 2013

(65) Prior Publication Data

US 2015/0144836 A1    May 28, 2015

(51) Int. Cl.
*C09K 3/22* (2006.01)
*B01J 2/30* (2006.01)
*C05G 3/00* (2006.01)

(52) U.S. Cl.
CPC ... C09K 3/22 (2013.01); B01J 2/30 (2013.01); C05G 3/0088 (2013.01)

(58) Field of Classification Search
None
See application file for complete search history.

(56) References Cited

U.S. PATENT DOCUMENTS

| | | | |
|---|---|---|---|
| 5,443,846 A * | 8/1995 | Yoshioka et al. | 424/498 |
| 6,162,836 A | 12/2000 | Kato | |
| 6,491,736 B1 | 12/2002 | Bell et al. | |
| 2009/0065736 A1 | 3/2009 | Johnson et al. | |
| 2009/0127499 A1 | 5/2009 | Tran et al. | |
| 2009/0178452 A1 | 7/2009 | Ogzewalla | |
| 2014/0264156 A1 | 9/2014 | Hay et al. | |

FOREIGN PATENT DOCUMENTS

| | | | |
|---|---|---|---|
| JP | 2011094007 A | | 5/2011 |
| WO | 2006068627 A1 | | 6/2006 |
| WO | 2010025518 A1 | | 3/2010 |

OTHER PUBLICATIONS

, "Production and Uses of Key Castor Oil Oleochemicals", Trade Sheet—Comprehensive Castor Oil Report—The definitive guide for entrepreneurs and investors.
, "Website http://www.lipidmaps.org/data/structure/LMSDSearch.php?Mode=ProcessClassSearch&LMID=LMFA0105&s=hydroxy fatty acids".
International Search Report for PCT application PCT/US2014/059718, international filed Oct. 8, 2014, Report mailed Feb. 26, 2015.

* cited by examiner

*Primary Examiner* — Necholus Ogden, Jr.
(74) *Attorney, Agent, or Firm* — Dorsey & Whitney LLP

(57) ABSTRACT

The invention is directed towards methods and compositions for preventing dusting problems in mineral supplement. The method involves treating the mineral supplement or a dust releasing material with a composition comprising polymerized organic acid.

12 Claims, No Drawings

COMPOSITION FOR DUST CONTROL

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

The present invention relates generally to one or more methods, compositions of matter, and or apparatuses useful in suppressing dust releases such as those from mineral supplement material.

Mineral supplements, like many hard crystalline materials tend to contain fines or to be friable and form fines, and these fines can be a dust releasing nuisance and therefore require dust control. These dust nuisances can create significant health, environmental, and safety problems.

Dust control methods are practiced in many industries handling such solids. For example, during the production of dry granular fertilizer certain mechanical conveyance steps may generate small particles of fertilizer that can be transported to undesirable locations by stray air currents. Worse, if the particle size is small enough the dust can remain suspended in the air for extended periods of time exacerbating these problems. As a result, a number of dust control technologies have been developed.

In addition, the properties and end uses of mineral supplement further complicate this situation. Because mineral supplements are directly applied in open environments to plant life and those plants in turn may be consumed by animals or humans, many effective dust control agents must also be non-toxic. Therefore, it is important that the environmental and dietary safety of additives should be considered. In addition dust control agents may not interact with the mineral supplement in any manner which would impair the benefit of the mineral supplement to the plant such as detrimentally changing pH or any other chemical property. Another category of chemicals used in dust control are asphaltenes or heavy petroleum based materials; unfortunately because they contain aromatics and because of other purity issues additives including them often pose health and environmental problems. Also many of these compositions can require cumbersome and dangerous heating systems just prior to their application.

As a result there is ongoing need and clear utility in a novel improved method and/or composition and/or apparatus for reducing dust release from mineral supplement. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR. §1.56(a) exists.

BRIEF SUMMARY OF THE INVENTION

At least one embodiment of the invention is directed towards a method of reducing the release of dust from a mass prone to release dust. The method comprises the step of: contacting the mass with a composition comprising a polymerized organic acid.

The polymerized organic acid may be constructed from monomers selected form the list consisting of hydroxy fatty acids such as: ricinoleic acid, 12-hydroxystearic acid, and any combination thereof. The polymerized organic acid may be a copolymer which also comprises glycerol repeating units, the glycerol repeating units being one of monoglycerol, diglycerol, triglycerol, and any combination thereof. The polymerized organic acid may be a block copolymer comprising a first chain consisting essentially of repeating polymerized organic acid repeating units and a second chain consisting essentially of repeating glycerol units, the first chain and the second chain being linked by an ester bond. The first chain may have an n value of more than 2. The polymerized organic acid may be a block copolymer comprising a first chain consisting essentially of repeating ricinoleic acid repeating units and a second chain consisting essentially of repeating glycerol units, the first chain and the second chain being linked by an ester bond. This block copolymer may have a first chain with an n value of more than 100.

The polymerized organic acid may also comprise alkoxy groups (such as ethoxy or propoxy) or repeating units thereof. The composition may be applied as a liquid, foam, dispersion, or an emulsion. The mass may be prone to release dust is an aggregation of mineral supplement, mined materials, synthesized dry materials, fertilizer, coal, wood chips, agricultural products, fruit, aggregates, fine materials, potash, phosphate, road dust, and any combination thereof. After the mass has been treated, the mass may be prone to release dust but will have a reduction in released dust that will persist indefinitely (possibly essentially permanently).

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Mineral Supplement" means a composition of matter characterized as being predominantly made up of materials which function as a form of animal feed and/or dietary supplement and/or nutritional supplement for consumption by an animal and/or which functions as a fertilizer for plants. Fertilizers are predominantly made up of inorganic substances, primarily salts and are in a form which increases the nutrients absorbed by plants. Fertilizers greatly affect the soil (its physical, chemical, and biologic properties) and plants. In soil, fertilizers undergo various changes that influence the solubility of their nutrients, their permeability, and their availability to plants. Fertilizers include direct plant nutrients (N, P, K, Mg, B, Cu, Mn) such as nitrogen fertilizers (ammonium, sodium, and calcium nitrates; ammonium sulfate; urea), phosphorus-supplying fertilizers (superphosphate, ground rock phosphate, ammonium and calcium phosphates), potassium fertilizers (potassium chloride, 30 and 40 percent potassium salt, potassium sulfates, potassium nitrate), and micronutrient fertilizers. Indirect fertilizers improve the agrochemical and physiochemical properties of soil and activate nutrients (for example, lime fertilizers and gypsum).

"Ricinoleic Acid" means a composition of matter which is an organic acid and may be according to the formula (as well as any steroechemical isomers thereof) of:

[Structure of ricinoleic acid shown]

"Polyricinoleic Acid" means a composition of matter which is characterized as being a polymer comprising a number of ricinoleic acid repeating units linked by ester bonds between the hydroxyl group along the fatty chain and the proton donating acid oxygen, the repeating units may be according to the formula (as well as any steroechemical isomers thereof) of:

[Polymer structure shown with repeating unit subscript n]

wherein n is the n value which is a number greater than 1.

"Polymerized Organic Acid" means a composition of matter characterized as being a polymer comprising ester linked repeating units in which the repeating units have a C4-C100 fatty chain along which are both at least one hydroxyl group and at least one end of at least one of the carboxylic acid group.

"Fatty Chain" means a portion of a repeating unit characterized as being a series of bonded carbon atoms in one or more arrangements selected from: alkyl, straight chain alkyl, branched alkyl, aryl, cyclo, phenyl, benzyl, cyclic, dendritic, and any combination thereof.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

In at least one embodiment of the invention a composition of matter is added to a mineral supplement material and/or a material prone to release dust. The composition comprises a polymerized organic acid. The application of the composition reduces the tendency of the mineral supplement material to release dust. In at least one embodiment the composition is applied to the material as a liquid. In at least one embodiment the composition is applied to the material as foam. In at least one embodiment the composition is applied to the material as dispersion. In at least one embodiment the composition is applied to the material as an emulsion.

Mineral supplement granules produce large amounts of fugitive dust. This is because ultra-fine mineral supplement particles are so light that they can be suspended and travel aloft when contacted by moving air. Mineral supplement commonly becomes ultra-fine due to excessive grinding or due to attrition of the delicate mineral supplement masses during processing or handling.

The effectiveness of the invention was quite surprising and in light of the teachings of the prior art the invention displays unexpected results.

In at least one embodiment the polymerized organic acid comprises repeating units of organic acids containing one or more hydroxyl functional groups selected from the list consisting of: ricinoleic acid, 12-hydroxystearic acid, and any combination thereof.

Fatty acids able to form polymerized fatty acids as defined above have to have at least one hydroxyl group in the carbon chain. A representative list of suitable hydroxy group bearing fatty acids can be found are listed on the website: http://www.lipidmaps.org/data/structure/LMSDSearch.php?Mode=ProcessClassSearch&LMID=LMFA0105&s=hydroxy fatty acids. (As accessed on Nov. 8, 2013)

In at least one embodiment the polymerized organic acid also comprises glycerol repeating units and can therefore also be considered a species of polyglycerol.

In at least one embodiment the polymerized organic acid also comprises alkoxy groups (such as ethoxy or propoxy) or repeating units thereof.

Without being limited by a particular theory or design of the invention or of the scope afforded in construing the claims, it is believed that the particular structure of the polymer is what affords the composition it unexpectedly high effectiveness as a dust control agent. Polymerized organic acids have large numbers of moderately polar ester bonds embedded within largely non-polar fatty region of the polymer. This allows for the formation of unique surface-surface interactions between the polymerized organic acid and the particulate matter. In addition they have just the right molecular weight to induce the formation of agglomerations that are massive and therefore resistant to airborne dispersal.

Polymerized organic acids may be produced from oleochemicals. Oleochemicals are chemicals derived from plant and animal fats. Most plant and animal oils are glycerides of mixtures of fatty acids. A glyceride is the reaction product of a carboxylic acid and glycerol. Often oleochemicals are formed by taking natural substances like fatty acids, fatty acid methyl esters (FAME), fatty alcohols, fatty amines and glycerols and performing various chemical and enzymatic reactions such as hydrolysis, and/or transesterification.

As described in the Trade Sheet "*Production and Uses of Key Castor Oil Oleochemicals*", Oleochemicals have been used for quite some time in various industries as lubricants, caulks, sealants, paint binders, adhesives, anti-static agents, and varnishes. As described in International Patent Application WO 2006068627 they have been used as an anti-caking agent in rubber manufacturing. They however have not been polymerized and then used as dust control agents for mineral supplements.

Japanese Patents Publication JP 2011094007 discloses a dust control agent containing water-swellable particles which includes a poly(ricinoleic acid)-polyoxyethylene block copolymer. In at least one embodiment the polymerized organic acid excludes the presence of oxyethylene monomers. In at least one embodiment the polymerized organic acid is a homopolymer and excludes the presence of copolymers and/or heteropolymers.

U.S. Pat. No. 5,443,846 describes the use of poly(ricinoleic acid) as a binder in a delayed release drug. This however is the opposite of the use in the invention because it is not used to delay release but to bind the mineral supplements indefinitely.

In at least one embodiment the polymerized organic acid is so dosed as to not allow for the timed release of the treated material.

In at least one embodiment the polymerized organic acid has an n value of between 1 and 1000 (or higher). In at least one embodiment the polymerized organic acid has a molecular weight of between 1000 (or lower) and 1,000,000 Dalton (or higher).

Materials prone to release dust to which the polymerized organic acid may be applied include but are not limited to mined materials, synthesized dry materials, fertilizer, coal, wood chips, agricultural products, fruit, aggregates, fine materials, potash, phosphate, road dust, and any combination thereof.

In at least one embodiment the polymerized organic acid is used according to the methods and/or alongside the compositions for dust control described in U.S. patent application Ser. Nos. 12/356,352 and 13/826,385.

EXAMPLES

The foregoing may be better understood by reference to the following examples, which is presented for purposes of illustration and is not intended to limit the scope of the invention. Laboratory analyses were conducted on samples of monoammonium phosphate which is a material prone to releasing fugitive dust. The monoammonium phosphate was treated with various polymerized organic acids as well as other materials for comparison. Table illustrates the results.

TABLE 1

| TEST | Fugitive Dust (ppm) | % Dust Reduction |
|---|---|---|
| Test #1 | | |
| Untreated | 5830 | 0% |
| Polyricinoleic acid 4 lb/ton | 889 | 85% |
| Polyricinoleic acid polyglycerol copolymer 4 lb/ton | 810 | 86% |
| Test #2 | | |
| Untreated | 3785 | 0% |
| Polyricinoleic acid 4 lb/ton | 342 | 91% |
| Polyricinoleic acid polyglycerol copolymer 4 lb/ton | 382 | 90% |
| Heavy Petroleum 4 lb/ton | 374 | 90% |
| Test #3 | | |
| Untreated | 6144 | 0% |
| Polyricinoleic acid 4 lb/ton | 1117 | 81% |
| Polymerized linseed oil resin 4 lb/ton | 3797 | 38% |
| Test #4 | | |
| Untreated | 4711 | 0% |
| Poly(12-hydroxystearic acid) 4 lb/ton | 856 | 82% |

The reduction in fugitive dust levels demonstrated the efficacy of various additives. Compared to a heavy petroleum based coating, the materials disclosed herein provided equal or better dust control performance while eliminating the use of petroleum derived materials. Compared to a polymerized linseed oil resin, polyricinoleic acid provided significantly improved fugitive dust control.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or more of the various embodiments described herein and/or incorporated herein.

The above disclosure is intended to be illustrative and not exhaustive. This description will suggest many variations and alternatives to one of ordinary skill in this art. The compositions and methods disclosed herein may comprise, consist of or consist essentially of the listed components, or steps. As used herein the term "comprising" means "including, but not limited to". As used herein the term "consisting essentially of" refers to a composition or method that includes the disclosed components or steps, and any other components or steps that do not materially affect the novel and basic characteristics of the compositions or methods. For example, compositions that consist essentially of listed ingredients do not contain additional ingredients that would affect the properties of those compositions. Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. Weight percent, percent by weight, % by weight, wt %, and the like are synonyms that refer to the concentration of a substance as the weight of that substance divided by the weight of the composition and multiplied by 100. Percentages and ratios are by weight unless otherwise so stated.

As used in this specification and the appended claims, the singular forms "a," "an," and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise. All chemical structures provided in this application contemplate and include every possible stereo isomers, conformational isomers, rotational isomers, and chiral alternative of the specific illustrated structure.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of reducing the release of dust from a mass prone to release dust, the method comprising the step of:

contacting the mass with a composition comprising a polymerized organic acid which comprise alkoxy groups, wherein the polymerized organic acid is a copolymer which comprises glycerol repeating units.

2. The method of claim 1 in which the polymerized organic acid is constructed from monomers selected from the list consisting of hydroxy fatty acids such as: ricinoleic acid, 12-hydroxystearic acid, and any combination thereof.

3. The method of claim 1, the glycerol repeating units being one of: monoglycerols, diglycerols, triglycerols, and any combination thereof.

4. The method of claim 1, the polymerized organic acid being a block copolymer comprising a first chain consisting essentially of repeating polymerized organic acid repeating units and a second chain consisting essentially of repeating glycerol units, the first chain and the second chain being linked by an ester bond.

5. The method of claim 4 in which the average number of repeating units is more than 2.

6. The method of claim 1 in which the polymerized organic acid is a block copolymer comprising a first chain consisting essentially of repeating ricinoleic acid repeating units and a second chain consisting essentially of repeating glycerol units, the first chain and the second chain being linked by an ester bond.

7. The method of claim 4 in which the first chain has an average number of repeating units of more than 100.

8. The method of claim 1 in which the alkoxy groups comprise ethoxy or propoxy groups.

9. The method of claim 1 in which the composition is applied as one or more selected from the list consisting of: foam, dispersion, emulsion, and any combination thereof.

10. The method of claim 1 in which the mass prone to release dust is an aggregation of mineral supplement, mined materials, synthesized dry materials, fertilizer, coal, wood chips, agricultural products, fruit, aggregates, fine materials, potash, phosphate, road dust, and any combination thereof.

11. The method of claim 1 in which after it has been treated, the mass prone to release dust will have a reduction in released dust that will persist indefinitely.

12. A method of reducing the release of dust from a mass prone to release dust, the method comprising the step of:

contacting the mass with a composition comprising a polymerized ricinoleic acid wherein the composition comprises glycerol repeating units and better dust control effects than a comparable amount of petroleum.

* * * * *